US009503091B2

United States Patent
Kirihata et al.

(10) Patent No.: US 9,503,091 B2
(45) Date of Patent: Nov. 22, 2016

(54) WORDLINE DECODER CIRCUITS FOR EMBEDDED CHARGE TRAP MULTI-TIME-PROGRAMMABLE-READ-ONLY-MEMORY

(71) Applicant: GLOBALFOUNDRIES INC., Grand Cayman (KY)

(72) Inventors: Toshiaki Kirihata, Poughkeepsie, NY (US); Derek H. Leu, Hopewell Junction, NY (US); Ming Yin, Nanuet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 135 days.

(21) Appl. No.: 14/084,641

(22) Filed: Nov. 20, 2013

(65) Prior Publication Data

US 2015/0138867 A1 May 21, 2015

(51) Int. Cl.
*G11C 11/56* (2006.01)
*G11C 16/08* (2006.01)
(Continued)

(52) U.S. Cl.
CPC ... *H03K 19/017509* (2013.01); *G11C 11/5671* (2013.01); *G11C 16/0466* (2013.01); *G11C 16/08* (2013.01); *G11C 16/12* (2013.01);
(Continued)

(58) Field of Classification Search
CPC .......... G11C 11/5671; G11C 16/0466; G11C 16/08; G11C 16/12; G06F 17/5045; G06F 2217/78; H03K 19/017509; Y04S 40/22; Y02E 60/76
USPC ................................ 365/104, 189.11, 203.06
See application file for complete search history.

(56) References Cited

U.S. PATENT DOCUMENTS 5,050,125 A 9/1991 Momodomi et al.
5,111,428 A 5/1992 Liang et al.
(Continued)

OTHER PUBLICATIONS

"A Compact eFUSE Programmable Array Memory for SOI CMOS", Safran, et al., 2007 Symposium on VLSI Circuits Digest of Technical Papers; pp. 72-73.
(Continued)

*Primary Examiner* — Vu Le
*Assistant Examiner* — Sung Cho
(74) *Attorney, Agent, or Firm* — Scully Scott Murphy and Presser

(57) ABSTRACT

Wordline decoder circuits for an embedded Multi-Time-Read-Only-Memory that includes a plurality of NMOS memory cells coupled to a plurality of wordlines in each row. The wordline decoder circuits control the charge trap behavior of the target NMOS memory array by the mode-dependent wordline high voltage (VWLH) and wordline low voltage (VWLL) trapping the charge in a programming mode by applying an elevated wordline voltage (EWLH) to one of the plurality of WLs, while de-trapping the charge in a reset mode by applying a negative wordline voltage (NWLL) to the entire array. The mode dependent voltage control is realized by switching to couple EWLH to VWLH in a programming mode, otherwise VDD to VWLH, while coupling NWLL to VWLL in a reset mode, otherwise, GND to VWLL. The switch includes plural gated diodes from VWLH with the wordline high protection voltage of VWLH_PR generated by lowering VWLH determined by gated diodes times threshold voltage. The switch includes a series of gated diodes from VWLL with a wordline low protection voltage of VWLL_PR generated by raising VWLL determined by the gated diodes by the threshold voltage, resulting in controlling the WL swing using thin-oxide devices.

14 Claims, 10 Drawing Sheets

(51) Int. Cl.
  *H03K 19/0175* (2006.01)
  *G11C 16/04* (2006.01)
  *G11C 16/12* (2006.01)
  *G06F 17/50* (2006.01)

(52) U.S. Cl.
  CPC ....... *G06F17/5045* (2013.01); *G06F 2217/78* (2013.01); *Y02E 60/76* (2013.01); *Y04S 40/22* (2013.01)

(56) References Cited

U.S. PATENT DOCUMENTS

| | | | |
|---|---|---|---|
| 5,341,342 A | | 8/1994 | Brahmbhatt |
| 5,821,800 A | * | 10/1998 | Le .................. H03K 17/102 326/62 |
| 5,969,542 A | * | 10/1999 | Maley ................ H03K 3/012 326/17 |
| 6,055,205 A | * | 4/2000 | Rao .................... G11C 16/08 365/104 |
| 6,487,687 B1 | * | 11/2002 | Blake ............ H03K 3/356113 324/762.07 |
| 7,227,400 B1 | * | 6/2007 | Gillespie ......... H03K 19/00315 327/333 |
| 7,804,350 B1 | * | 9/2010 | Edmondson ..... H03K 3/356113 326/63 |
| 7,817,455 B2 | | 10/2010 | Fredeman et al. |
| 2001/0048621 A1 | * | 12/2001 | Brass ................... G11C 29/26 365/200 |
| 2005/0134312 A1 | * | 6/2005 | Seo ................. H03K 19/09485 326/81 |
| 2006/0091907 A1 | * | 5/2006 | Khan .................. H03K 17/102 326/81 |
| 2008/0137466 A1 | * | 6/2008 | Nakamura ............... G11C 8/08 365/227 |
| 2009/0261792 A1 | * | 10/2009 | Kim ...................... G11C 5/147 323/282 |
| 2010/0061175 A1 | * | 3/2010 | Kim ......................... G11C 8/08 365/226 |
| 2010/0201427 A1 | * | 8/2010 | van den Berg ........ H03K 3/012 327/333 |
| 2010/0302880 A1 | * | 12/2010 | Wang ................... G11C 11/417 365/189.11 |
| 2011/0199837 A1 | * | 8/2011 | Reohr ................ G11C 11/4085 365/189.06 |
| 2012/0182060 A1 | * | 7/2012 | Rana ................ H03K 3/356165 327/333 |
| 2012/0195142 A1 | * | 8/2012 | Lee .......................... G11C 8/08 365/194 |

OTHER PUBLICATIONS

"A 0.13um 2.125MB 23.5ns Embedded Flash With 2GB/s Read Throughput for Automotive Microcontrollers", Demi, et al., 2007 IEEE International Solid-State Circuits Conference; pp. 478-479.

"High Performance Embedded Dynamic Random Access Memory in Nano-Scale Technologies" T. Kirihata; Springer ISBN 978-90-481-9215-1, Chapter 10, pp. 295-336.

"22nm High-Performance SOI Technology Featuring Dual-Embedded Stressors, Epi-Plate High-K Deep-Trench Embedded DRAM and Self-Aligned Via 14LM BEOL", Narasimha, et al., IEEE IEDM, Dec. 2012.

"5.5GHz System z Microprocessor and Multichip Module", Warnock, et al., IEEE International Solid-State Circuits Conference; 2013.

* cited by examiner

SIMULATED WAVEFORM-
RESET MODE

SIMULATED WAVEFORM-
READ MODE

WORDLINE DECODER CIRCUITS FOR EMBEDDED CHARGE TRAP MULTI-TIME-PROGRAMMABLE-READ-ONLY-MEMORY

CROSS-CORRELATION TO RELATED PATENTS

This application is related to patent application Ser. Nos. 14/084,646 and 14/084,644 filed concurrently herewith, and incorporated by reference in all its details.

FIELD OF THE INVENTION

The present invention relates to wordline decoder circuits for an embedded Multi-Time-Programmable-Read-Only-Memory eMTPROM) for high-performance logic technology, the eMTPROM using an elevated wordline voltage supply in a programming mode, and respectively a negative voltage supply in a reset mode.

BACKGROUND

Conventional design requiring embedded non-volatile memories have utilized electrical fuses (hereinafter referred to as eFUSE). However, these fuses have been found to rapidly become unfavorable in areas requiring a high level of efficiency due to the technology continuing scaling down. Furthermore, eFUSE are found not to allow reprogramming data bits that results in a one time programmable ROM. High density nonvolatile memories such as a NAND or NOR type flash memory have been found to only partially overcome these problems. However, inherently adding undesirable device structures such as a floating gate or ultra-thick oxide produce electrical parasitics (i.e., excessive capacitance, high voltages, typically greater than 5V), which are not supported in high performance logic technologies. These considerations require complex additional process elements to be integrated to the high-performance logic technologies, resulting in a high cost.

SUMMARY

In an embodiment, the invention employs wordline decoder circuits using a mode-dependent wordline high and low voltages and protection voltages to control a wordline swing for safeguard the devices from high voltages during programming and reset mode. More specifically, wordline decoder circuits employ all thin-oxide devices to drive an N-type MOSFET (NMOS) memory array coupling to Meshed-Source-Line-Network (MSLN) without any floating gates (FG). Wordline decoder circuits drive the selected wordline to an elevated voltage such that a charge (electrons or e⁻) is trapped in the dielectric of the targeted NMOS. This results in an increase of the initial NMOS threshold voltage ($VT_0$) of the targeted NMOS to $VT_1$ in a programming mode. Wordline decoder circuits keep the unselected wordlines at ground (GND) level in order not to trap the charge in the dielectric of the untargeted NMOS, keeping the untargeted NMOS threshold voltage unchanged during the targeted NMOS programming mode.

In another embodiment, the wordline drivers includes a first PMOS device as a wordline pull-up device, which gate, source and drain are coupled to a first level shifter, a wordline high voltage (VWLH), and a first node, respectively, a second PMOS device acting as a protection device, whose gate, source, and drain are coupled to a first protection voltage (VWLH_PR), the first node, and wordline (WL), respectively, with the first NMOS device as a protection device, whose gate, drain and source are coupled to a second protection voltage (VWLL_PR), the WL, a second node, and a second NMOS serving as a pull-down device whose gate, drain and source coupled to a second level shifter, the second node, and a wordline low voltage (VWLL), such that the selected wordline is activated to an elevated voltage (EWLH) in a programming mode for the charge trapping, and wherein all the worldlines in the entire array are pulled-down to a negative voltage (NWLL) during reset mode for de-trapping concurrently the charge in the entire array.

In yet another embodiment, the first level shifter further includes a first series devices of having a third PMOS, whose source and drain coupling to a wordline high voltage (VWLH) and third node, with the fourth PMOS acting as a protection device for the third PMOS, whose gate, source, and drain are coupled to the wordline high protection voltage (VWLH_PR), and further, the third node, and fourth node, third NMOS as a protection device for the fourth NMOS, whose gate, drain, and source are coupled to VDD, the fourth node, and fifth node, the fourth NMOS whose gate, drain, and source are a row selection signal (bSEL), fifth node, and GND, and second series devices of a fifth PMOS, whose source, and drain coupling to the VWLH, and the sixth node (or signal bPON), sixth PMOS, as a protection device for the fifth PMOS, whose source, and drain are coupled to the VWLH_PR, sixth node (or signal bPON), and seventh node, fifth NMOS device whose gate, drain, and source are coupled to VDD, the seventh node, and the eighth node, sixth NMOS, whose gate, drain, and source are coupled to the inverted bSEL, the eighth node, and GND, wherein the gate of third PMOS and fifth PMOS are cross-coupled to the drain of the fifth PMOS and third PMOS, such that the signal bPON (or sixth node) goes low to turn on the first PMOS in the wordline driver, activating the WL when the row is selected by the signal bSEL.

In still another embodiment, the second level shifter further includes third series devices of seventh PMOS, whose gate, source, and drain coupling to a row selection signal (bSEL), VDD, and ninth node, eighth PMOS, as a protection device for the seventh PMOS, whose gate, source, and drain are coupled to GND, the 9$^{th}$ node, and tenth node, seventh NMOS, as a protection device for eighth NMOS, whose gate, drain, and source are coupled to a wordline low protection voltage (VWLL_PR), the tenth node, and 11$^{th}$ node, the eighth NMOS whose drain, and source are 11$^{th}$ node, and a wordline low voltage (VWLL), and fourth series devices of having the 9$^{th}$ PMOS, whose gate, source, and drain coupling to an inverted row selection signal (bSEL), VDD, and the 12$^{th}$ node, tenth PMOS, as a protection device for the 9th PMOS, whose gate, source, and drain are coupled to GND, the 12$^{th}$ node, and 13$^{th}$ node, 9th NMOS, as a protection device for the tenth NMOS, whose gate, drain, and source are coupled to VWLL_PR, the 13$^{th}$ node, and fourteenth node (or signal NON), the tenth NMOS whose drain, and source are the fourteenth node, and the VWLL, wherein said the gate of the eighth NMOS and the gate of the tenth NMOS are cross-coupled to the drain of the tenth NMOS and the drain of the eighth NMOS, such that the fourteenth node (or the signal NON) remain disabling the unselected WLs by the second NMOS in the wordline driver unless the row is selected by the signal (bSEL).

In a further embodiment, mode dependent switch includes a first switch to couple an elevated wordline voltage (EWLH) to VWLH in programming mode, and otherwise to couple to VDD, wherein VWLH is coupled in series of the gated diode to generate a VWLH_PR to reduce the VWLH by a predetermined voltage, and a second switch to couple a negative wordline voltage (NWLH) to VWLL in reset mode, and, otherwise, to couple to GND, wherein VWLL is coupled to a series of gated diodes to generate VWLL_PR to increase VWLL by a predetermined voltage thereby protecting the first and second level shifter and WL pull-up and pull down devices in any mode selection.

In a further embodiment the wordline decoder circuits controlling a charge trap behavior of an N-type MOSFET (NMOS) memory array having a plurality of rows and columns, includes a driver for a wordline, wherein the driver comprises a first P-type MOSFET (PMOS), a second PMOS, a first NMOS, and second NMOS, a source and drain coupled serially in a predetermined order from a wordline high voltage (VWLH) to a wordline low voltage (VWLL), a decoder coupled to a gate of the first PMOS and the gate of the second NMOS to select one out of the plurality of rows in the memory array, wherein the first PMOS activates one out of the plurality of wordlines selected by the decoder to the VWLH, while keeping remaining wordlines inactivated with VWLL, and wherein the VWLH and the VWLL are controlled by a mode dependent voltage switch.

BRIEF DESCRIPTION OF THE DRAWINGS

Embodiments of the present invention will be understood and appreciated more fully from the following detailed description of embodiments of the invention taken in conjunction with the accompanying drawings of which.

DETAILED DESCRIPTION

Figure 1:
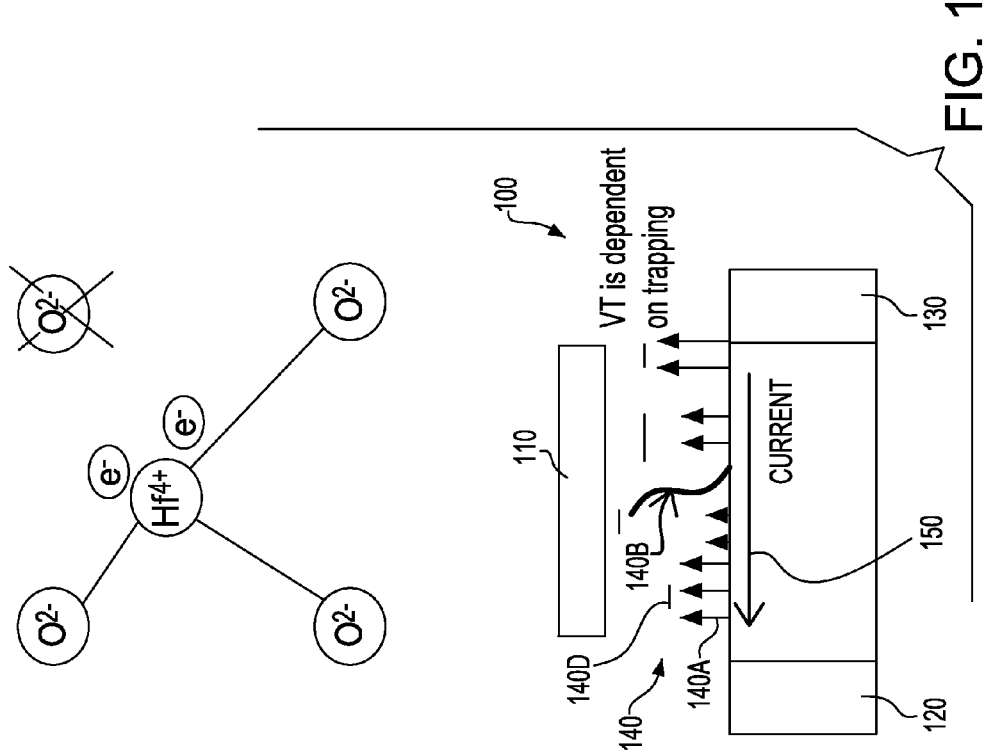
FIG. 1 shows a prior art charge trap memory cell.

Referring to FIG. 1, a basic charge trap memory cell will be illustrated. The charge trap memory uses a high performance logic NMOS without having a floating gate (FG). The NMOS has an initial threshold voltage of $VT_0$ for '0' data. In programming 1 mode, the charge trap memory cell can use the behavior to trap some electrons (e–) to the vacancy of oxygen ($O_2$) in the dielectric (140) of the NMOS (100). The NMOS having a High-K dielectric, such as a Hafnium ($Hf_4$) oxide demonstrates the charge trapping behavior. The High-K material dielectric is commonly used for high performance logic technology. The vacant oxygen point (140D) in $Hf_4$ oxide (140) traps some electrons (140A) in condition of applying a high voltage to the gate (110) while applying the high voltage between the source (120) and the drain (130) such that the NMOS strongly turns on to flow a large current though the channel (150). The trapped charges (e–) increase the NMOS threshold voltage to $VT_1$ (=$VT_0$+AVT). The trapped electrons (e–) (140B) can be eliminated by applying a negative voltage between the gate (110) and source (120), recovering the $VT_0$ condition.

Figure 2:
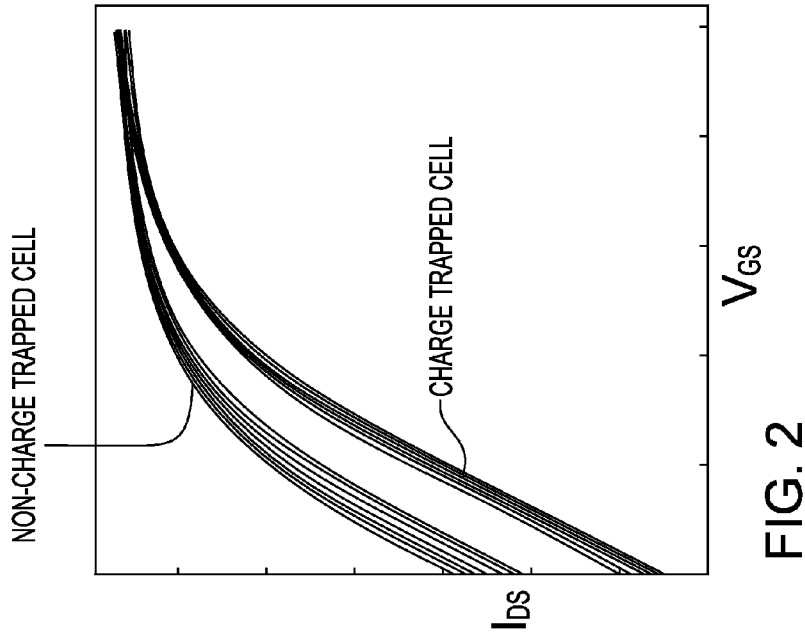
FIG. 2 illustrates a measured source to drain current ($I_{DS}$) with respect to the gate to source voltage of an NMOS transistor.

Referring to FIG. 2, the measured drain to source to current ($I_{DS}$) with respect to the gate to source voltage ($V_{GS}$) of the $Hf_4$ NMOS transistor (100) are shown. $I_{DS}$ can be measured while applying the programming 1 and resetting conditions several times. As expected, trapping the electrons increases the NMOS threshold, resulting in a smaller current than without trapping. The $VT_1$ of the charge trapped NMOS can be successfully reset to $VT_0$ of a non-charge trapped NMOS.

In an embodiment, the charge trap memory can use the charge trapping behavior to store a data bit. The memory does not require floating a gate (FG) because the charge (e–) is trapped in the dielectric of the high performance logic NMOS, resulting in an ideal solution to develop an embedded Multi-Time-Programmable Read Only Memory (eMTPROM) preferably for a high performance logic technology. The challenge of eMTPROM is to maximize the charge trap efficiency with a simple control while protecting the high performance NMOS device that uses a thin oxide and a low threshold voltage, in which the wordline decoder circuits are essential to effectively trap the charge in a programming mode, and de-trapping the charge in reset mode.

Figures 3, 4:
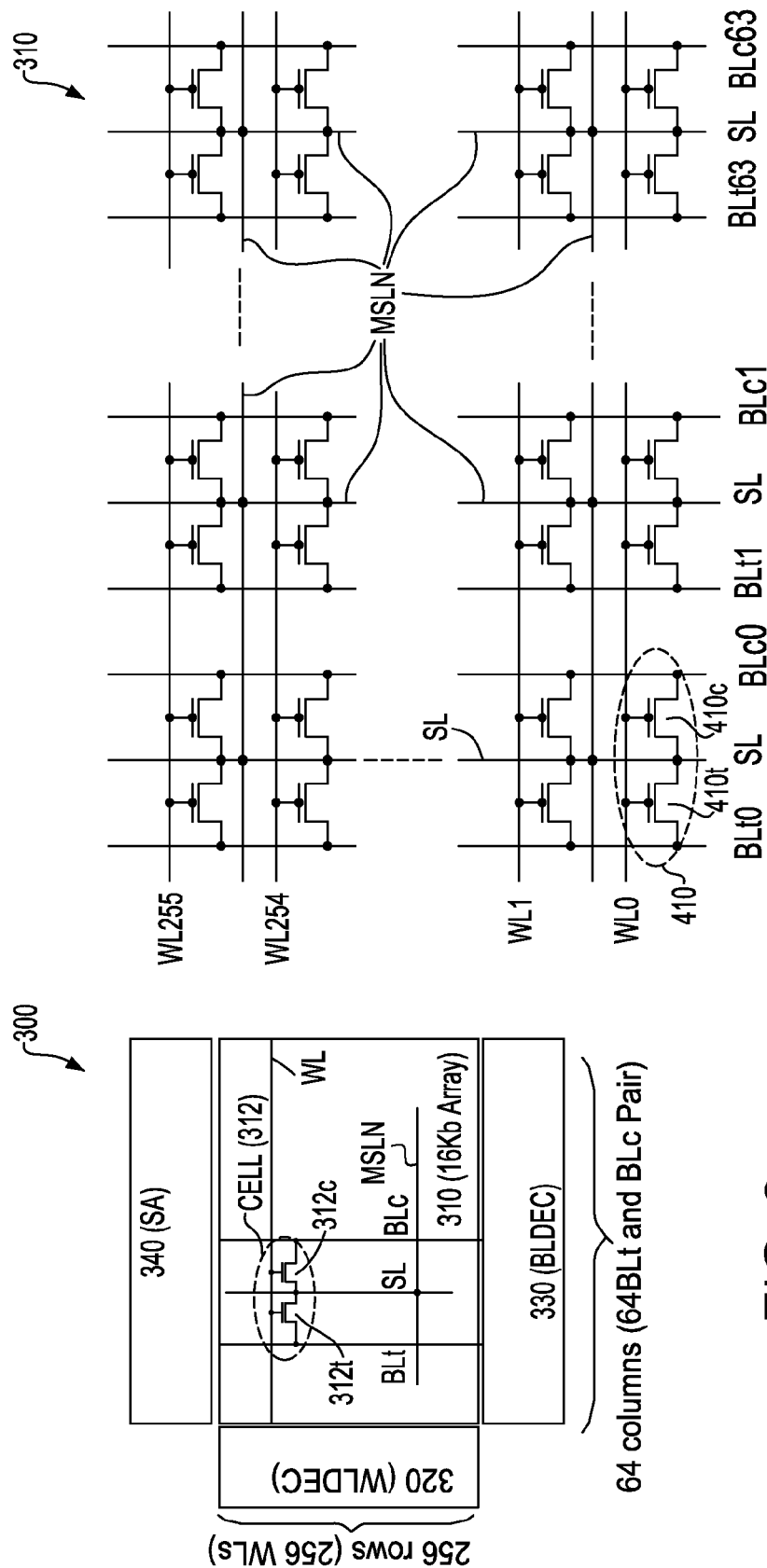
FIG. 3 Illustrates an architecture shown to configure an eMTPROM.
FIG. 4 illustrates a 16 Kb array consisting of 16K memory cells, each having two NMOS arranged in 128 rows×64 columns.

Referring to FIG. 3, a chip architecture is shown to configure an eMTPROM (300) consisting of a NOR-type NMOS array (310), a wordline decoder block (320: WLDEC), a bitline decoder block (330: BLDEC) and sense-amplifier block (340 SA), where the structure of the WLDEC (320) and the control method of the array (310) are essential. In an embodiment, the NOR-type NMOS array (310) preferably includes a plurality of memory cells, each having a true bit of NMOS and complement bit of NMOS for a 16 Kb density. More specifically, the 16 Kb array consists of 16K cells (312), each having two NMOS (312t for a true bit and 312c for a complement bit) arranged in 256 rows coupled to 256 wordlines (WLs) and 64 columns coupled to 64 bitline true (BLt) and bitline complement (BLc) pairs in a two dimensional matrix. The drains of the twin NMOS couple the Source-Line (SL) and the Meshed-SL-Network (MSLN) in the entire memory 16 Kb array, where MSLN are precharged at the voltage source (VDD=1V) in the standby, read, or reset mode, and an elevated bitline voltage (EBLH=1.5V) in the programming mode.

256 rows are controlled by wordline decoder block (320: WLDEC) to activate one out of the 256 rows (or 256 WLs)

for programming and for read modes. When WL is activated, 64 cells coupled to the activated WL are simultaneously selected. For a programming (write) mode, 8 out of 64 columns are selected to strongly discharge either true bitline (BLt) or complement bitline (BLc) in the targeted bitline to ground (GND) by the bitline decoder block (330: BLDEC); BLDEC controls the corresponding column, each having BLt and BLc pair such that the 8 bit parallel programming out of 64 columns are enabled simultaneously. The ⅛ selection is preferred in order to avoid a large voltage drop in view of the charge trapping in the programming mode requiring a large current. In a read mode, a 64 sense amplifier blocks (340: SA) can be used for sensing all the 64 bits selected by the activated WL since the read current is significantly less than the programming current. Optionally, SA (340) may employ an additional decoder to reduce the number of read bits, if required.

Referring to FIG. 4, a detailed 16 Kb array (310 in FIGS. 3-4) consisting of 16K memory cells (410), each having two NMOSs (410t and 410c) is described. They are arranged in 256 rows, each of the row coupled to the corresponding WLs, and 64 column, each of the column coupled to BLt and BLc pair. The source line (SL) coupled to the common node of each cell (410) are arranged in both, row and column directions creating a meshed source line network (MSLN).

The chip is controlled by the three modes (1) Programming, which trap a charge to change the threshold voltage of either true NMOS (410t) or complement NMOS (410c) from an initial state ($VT_0$) to trapped state ($VT_1$); (2) Read mode, which detects the charge trap or non-trapped state by a sense amplifier, output the digital state from the chip, and (3) Reset mode, which de-traps the charge to recover the initial threshold voltage ($VT_0$).

Prior to enable a write, reset, or read operations, the chip can be at a standby state, where all the wordlines are at a wordline low voltage (VWLL=0V), disabling all the NMOSs. Data is written by raising the wordline coupling to the target NMOS to an elevated wordline high voltage (EWLH=2V), while applying a large drain to source voltage ($V_{DS}$=1.5V) of the target NMOS. Thus, this strongly turns on the targeted NMOS because $V_{GS}$ is at 2V and $V_{DS}$ at 1.5V, resulting in trapping electrons from a larger current flow through the channel of the strongly turned on NMOS.

Figures 5, 6, 7:
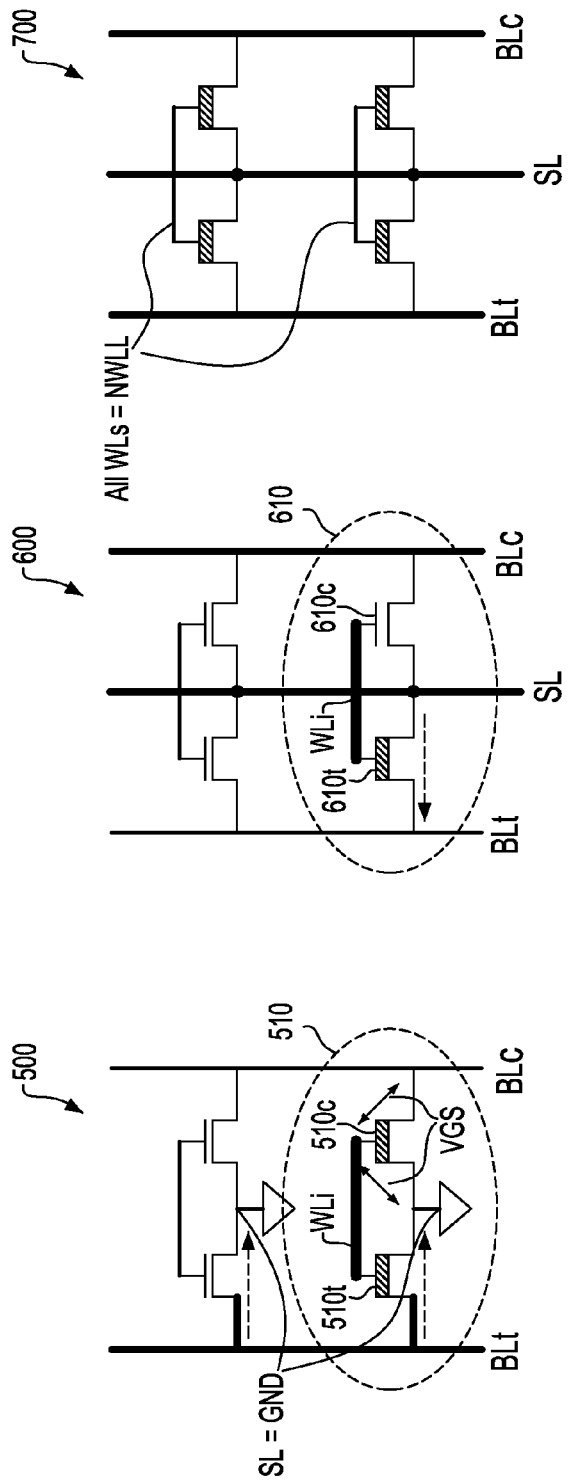
FIG. 5 shows a source-line (SL) precharged at ground.
FIG. 6 depicts the SL shown in FIG. 5 precharged at a bitline high voltage (VBLH), according to an embodiment of the invention.
FIG. 7 depicts a reset condition, where SL and BL voltages are VBLH (1V) similar to a standby state, in accordance with an embodiment of the present invention.

FIG. 5 shows a conventional approach having the source-line (SL) precharged at GND commonly used eFUSE or conventional nonvolatile memories. For simplicity, the schematic (500) shows one column of the array seen in FIG. 4. BLs and WLs are at GND in standby. For programming to the memory cell 510, WLi is raised to EWLH (2V), while raising BLt to 1.5V, and while keeping BLc at GND. This creates a large gate to source voltage ($V_{GS}$) of 2V to the NMOS (510c) resulting in a high risk for device reliability. Note that all the columns in the array (310 in FIG. 4) coupled to the WL recognize the risky condition during programming NMOS (510t).

FIG. 6 shows an embodiment with SL precharged at bit-line high voltage (VBLH=1V). BLs and WLs are at VBLH (1V), and GND, respectively in a stand-by state. For simplicity, the schematic (600) shows one column of the array illustrated in FIG. 4. For programming mode 1 to the memory cell 610, the VBLH voltage is raised to an elevated bitline voltage (EBLH=1.5V). Then, WLi is raised to EWLH (2V), while discharging either BLt or BLc (i.e., BLt coupled to NMOS 610t) to 0V. Since the other BL (i.e., BLc is coupled to NMOS 610c), it maintains EBLH at 1.5V, and $V_{GS}$ of NMOS (610c) at only 0.5V, protecting NMOS. Although $V_{GS}$ of NMOS (610t) is at 2V, the high $V_{GS}$ condition can only occur while the NMOS cell is programmed, which is significantly less time than the conventional approach occurring high $V_{GS}$ condition for any cell programming coupling the same WLs.

The read mode is enabled by activating one of the WL (i.e. WLi) to VDD (1V) while weakly discharging both BLt and BLc weakly to GND. This results in developing a differential voltage on the BLt and BLc pair that is converted to a digital output by sense amplifier 340, shown in FIG. 3.

FIG. 7 shows an embodiment of a reset condition, where SL and BL voltages are VBLH (1V) similar to a standby state. All WLs in the entire array are discharged to a negative wordline voltage (NWLL), resulting in applying −2V to the gate to source (VGS) of the NMOSs, de-trapping the charge from all NMOSs of the entire array concurrently.

A primary consideration of the wordline driver circuits in embodiments is to control the wordline high and low voltages and their protection voltages depending on a mode such that thin-oxide devices in wordline decoder circuits are protected for the programming and reset modes.

Figure 8:
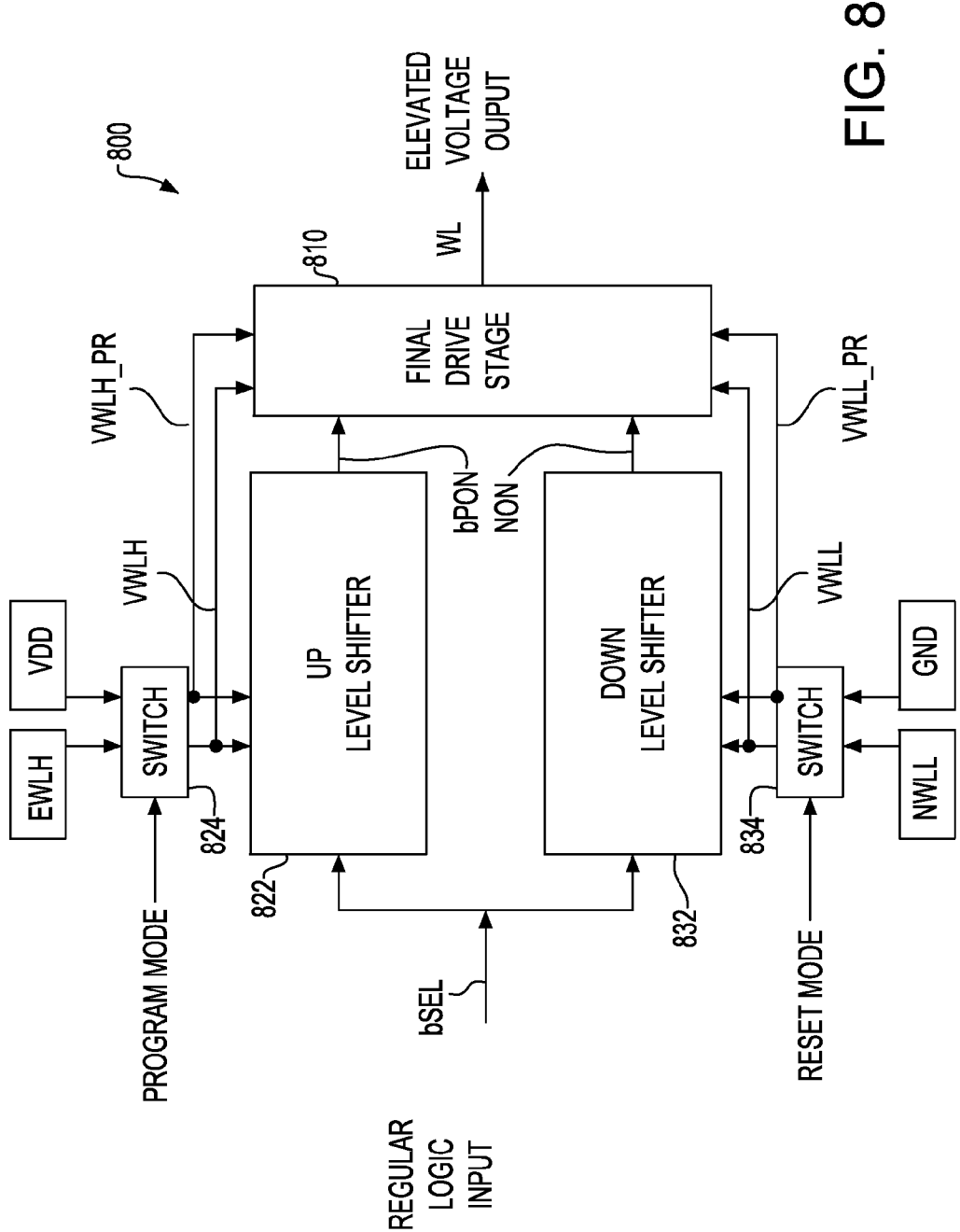
FIG. 8 shows a block diagram for controlling a wordline to trap and untrap the charge using logic compatible thin oxide devices.

FIG. 8 shows a block diagram for controlling the wordline to trap and de-trap the charge using logic compatible thin oxide devices. Wordline decoder circuits (800) receive the row selection signal (bSEL), i.e., a conventional CMOS level input which swings from 0 to VDD (1V). The inputs are converted to an up-level shifted voltage signal (bPON) by the up-level shifter (822) and an down-level shifted voltage signal (NON) by the down-level shifter (832). The up-level shifter and down-level shifter control the final driver (810) to control the WL swing.

Controlling the WL voltage depends on the mode of program, reset, and read, the wordline high voltage (VWLH) coupled to the up level shifter (822) and driver (810) is controlled by a first mode dependent switch (824) selecting an elevated voltage (EWLH) when in program mode, and otherwise VDD. The switch (824) can also include a conversion to generate the protection voltage (VWLH_PR). The wordline low voltage (VWLL) coupled to a down level shifter (832) and driver (810) are controlled by a second mode dependent switch (834) selecting a negative wordline low voltage (NWLL) in reset mode and, otherwise, to GND. The switch (834) can also includes a conversion to generate the protection voltage (VWLL_PR).

Figure 9:
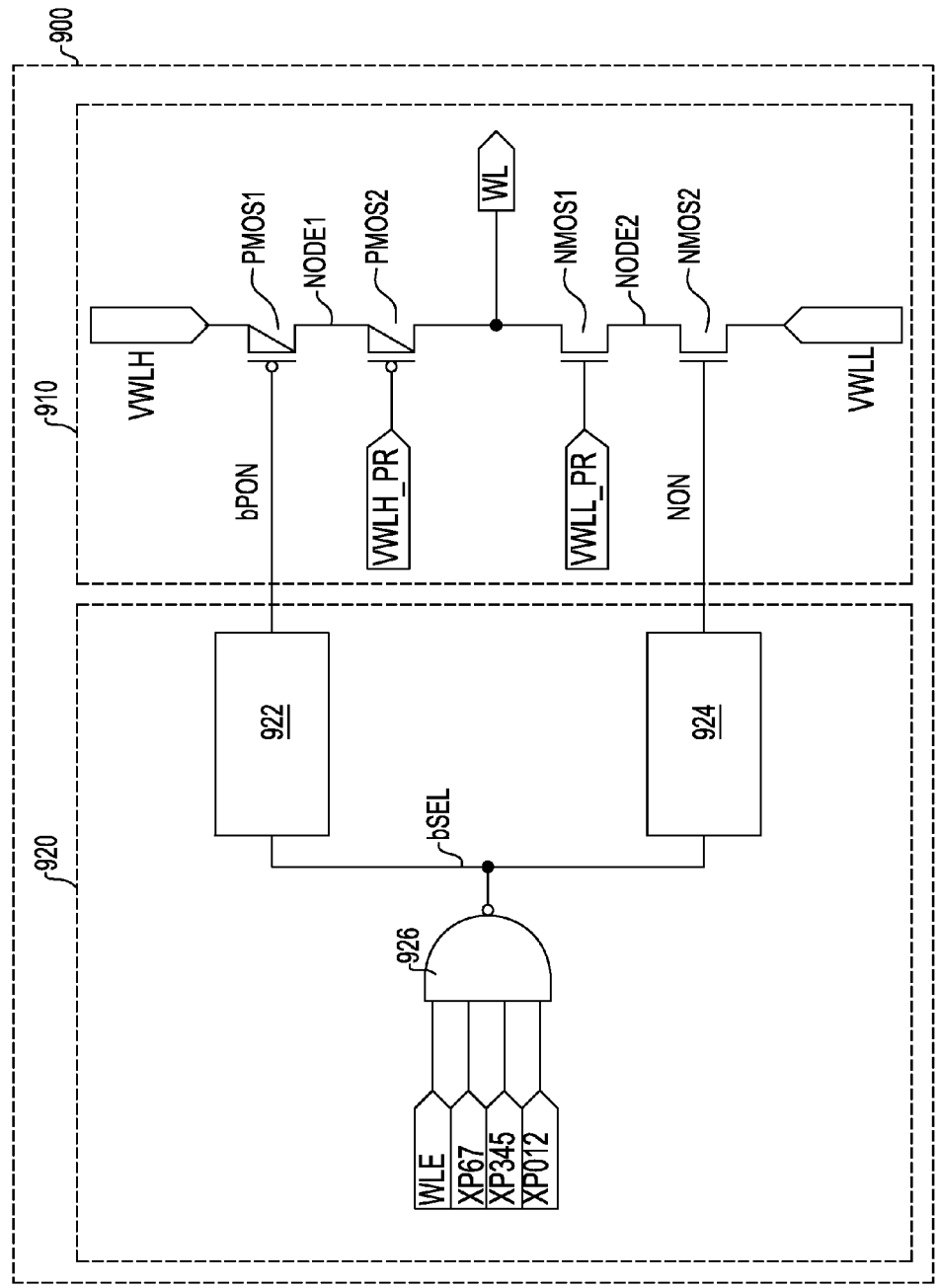
FIG. 9 shows a detailed schematic of wordline driver circuits including a de-coder and a driver.

Referring to FIG. 9 a detailed schematic of wordline driver circuits 900 that includes decoder 920 and driver 910 is shown. The driver 910 includes a plurality of devices of PMOS1-2 and NMOS 1-2 coupling from a wordline high voltage (VWLH) to a wordline low voltage (VWLL) in the stated order. PMOS1 and NMOS2 are transistors to pull up WL to a high and pull down the WL low, respectively. They are controlled by the signal bPON and NON generated by the decoder (920). The decoder also includes an AND decode (926), first level shifter 922, and second level shifter 924. More specifically, the NAND is turned on with signal XP012, i.e., the pre-decoded address using address 0, 1, and 2, and with signal XP345, the pre-decoded address using address 3, 4, and 5, and with the signal XP67, the pre-decoded address using address 6 and 7, that are high when the wordline enable signal (WLE) goes high. The inputs (XPs and WLE) are the CMOS level input (0 to VDD swing), which generates a CMOS level output (bSEL). This results in making the NAND decoder output bSEL low, selecting one of 256 rows using the address between 0-7. The CMOS level output (bSEL) is converted to another level by the first level shifter (922) and the second level shifter (924). More particularly, the signal bSEL is coupled to the first level shifter 922 (level conversion to approximately VWLH_PR to VWLH swing), coupled to the PMOS1 for the WL pull up, and a second level shifter 924 (the level conversion to VWLL to approximately VWLL_PR swing) coupled to the NMOS2 for pull down the WL. This results in pulling down the signal bPON low, activating the PMOS1, while keeping the signal NON at low to disable the NMOS2 when the row is selected (bSEL low), activating the WL to the VWLH voltage. Otherwise, bPON and NON are maintained at a high level disabling PMOS1 while enabling the NMOS2 to maintain the WL at VWLL level. The PMOS2 coupling to VWLH_PR protects the node NODE1 in order not to make the voltage lower than VWLH_PR due to the PMOS2 threshold voltage regardless of the WL voltage. Furthermore, protecting PMOS1, NMOS1 coupled to VWLL_PR protects the node NODE2 in order not to make the voltage higher than VWLL_PR due to NMOS1 threshold voltage regardless of the WL voltage, protecting NMOS2. As described previously, VWLH, and VWLL voltages are changed depending on the mode (VWLH=2V when in programming mode; otherwise 1V, and VWLL=−1V in reset mode; and otherwise 0V).

Figure 10:
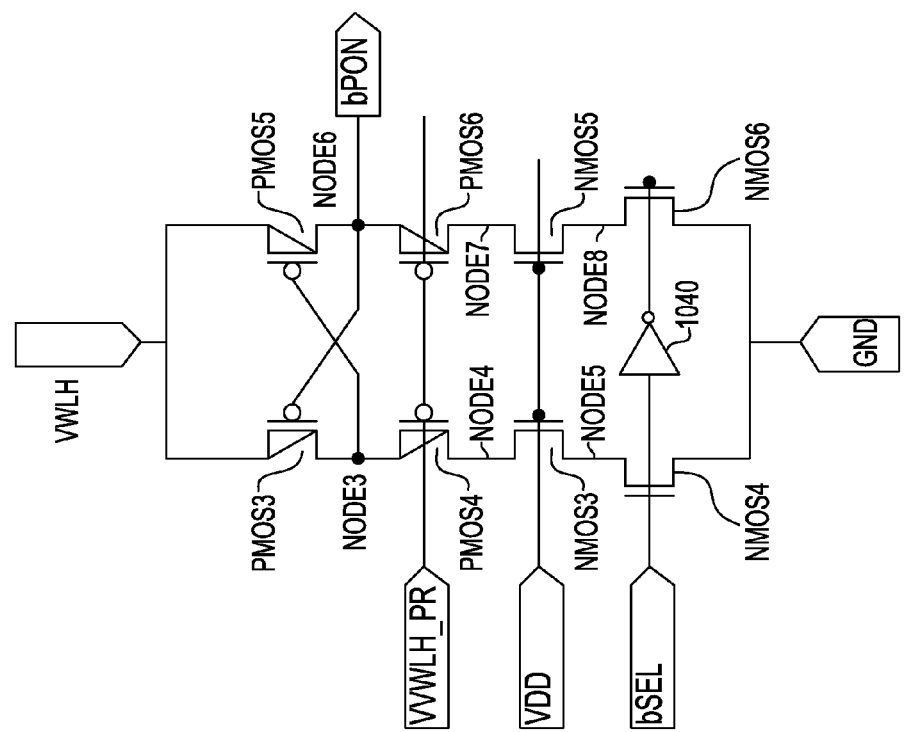
FIG. 10 illustrates an embodiment showing a first level shifter to convert the output voltage of bSEL from the NAND (seen in FIG. 9) to a level shifted voltage signal bPON.

FIG. 10 shows an embodiment of a first level shifter (922) to convert the output voltage of bSEL from the NAND (926 in FIG. 9) to level shifted voltage signal bPON. The signal bPON coupled the PMOS1 drive WL to high when the row is selected by the signal bSEL. The level shifter includes first plurality of devices having PMOS3-4, and NMOS3-4 coupled from wordline high voltage (VWLH) to GND. The level shifter can also include a second plurality of devices having PMOS5-6, and NMOS5-6 coupling from VWLH to the GND.

When the NAND decoder (926 in FIG. 9) does not select a row, the signal bSEL is high which enables NMOS4 and disables NMOS6 because of the bSEL inversion using inverter (1040). PMOS4-6 are on, resulting from the gate voltage at VWLH_PR since it is lower than VWLH by a predetermined voltage (i.e., 1V). NMOS3-5 is on because the gate voltage is at VDD, resulting in pulling down NODE3, enabling the NMOS4 therefore pulling down the NODE3 through NMOS3 and PMOS 4. However, the NODE3 voltage down level is limited to VWLH_PR, protecting PMOS3 from the high voltage gate to source ($V_{GS}$) condition. Disabling NMOS6 and low-going NODE3 turns on PMOS5, pulling up NODE6 (or signal boon) high. NODE8 up-level is limited to VDD, protecting the NMOS6 from high voltage $V_{GS}$ condition. In conclusion, the output bPON is therefore kept at voltage VWLH that forces PMOS1 in FIG. 9 to be turned off, while protecting the devices. WL is kept at VWLL by NMOS2 in FIG. 9 because the signal NON is high, (details thereof to be described hereinafter).

When the NAND decoder (926) selects a row, the signal bSEL goes low, which disables NMOS4, and enables NMOS6 because of the bSEL inversion using inverter (1040). This enables PMOS3 and NMOS6 to turn on, pulling up NODE3 to VHWH and pulling down NODE6 (or signal bPON). The NODE5 level is limited to approximately VDD, and the NODE6 level is limited to approximately VWLH_PR, protecting the NMOS4 and PMOS5 from high $V_{GS}$ conditions. The low-going signal bPON turns on the PMOS1 in FIG. 9 WL is activated to VWLH voltage. Signal NON stands at low, disabling NMOS2.

Figure 11:
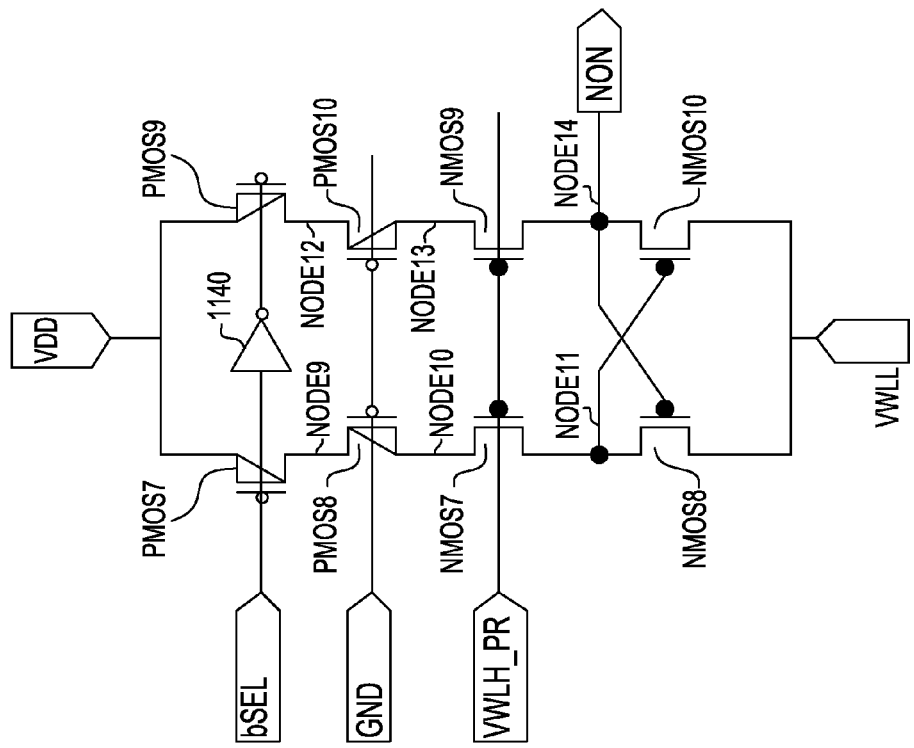
FIG. 11 shows a second level shifter for converting the output signal bSEL from a NAND gate to a level shifted voltage signal NON, according to an embodiment.

FIG. 11 shows an embodiment of a second level shifter (924), which converts the output signal bSEL from the NAND (926) to a level shifted voltage signal NON. The signal NON is coupled to NMOS2 to drive WL to low when the row is not selected. The level shifter (924) includes a first plurality of devices having PMOS7-8 and, NMOS7-8 coupled from VDD to a wordline low voltage (VWLL). The level shifter (924) also includes a second plurality of devices having PMOS9-10, NMOS9-10 coupling from VDD to the WVLL.

When NAND decoder (926) does not select the row, the signal bSEL is high, which disables PMOS7 and enables the PMOS9 because of the bSEL inversion using inverter (1140). PMOS8 and PMOS10 are on because the gate voltage is at GND, and NMOS7 and NMOS9 are on because the gate voltage of VWLL_PR is higher than VWLL by a predetermined voltage (i.e. 1V). This results in pulling up the NODE14 (or the signal NON) up to approximately VWLL_PR, making NMOS2 in FIG. 9 to turn on, keeping the WL at VWLL voltage, as previously described.

When NAND decoder (926) selects the row, the signal bSEL goes low, which enables PMOS7 and disables PMOS9. This results in pulling down the signal NON to VWLL, making NMOS2 in FIG. 9 to turn off. Since bPON is low, the WL goes high.

During the aforementioned operation, PMOS7-9 are protected from the high VGS condition by PMOS8 and PMOS10 because the lowest voltage of the NODE9 and NODE12 are limited to be higher than GND regardless of the VWLL voltage. NMOS8-10 is also protected by the NMOS7 and NMOS9 because highest NODE11, and NODE14 are limited to lower than VWLL_PR.

Figure 12:
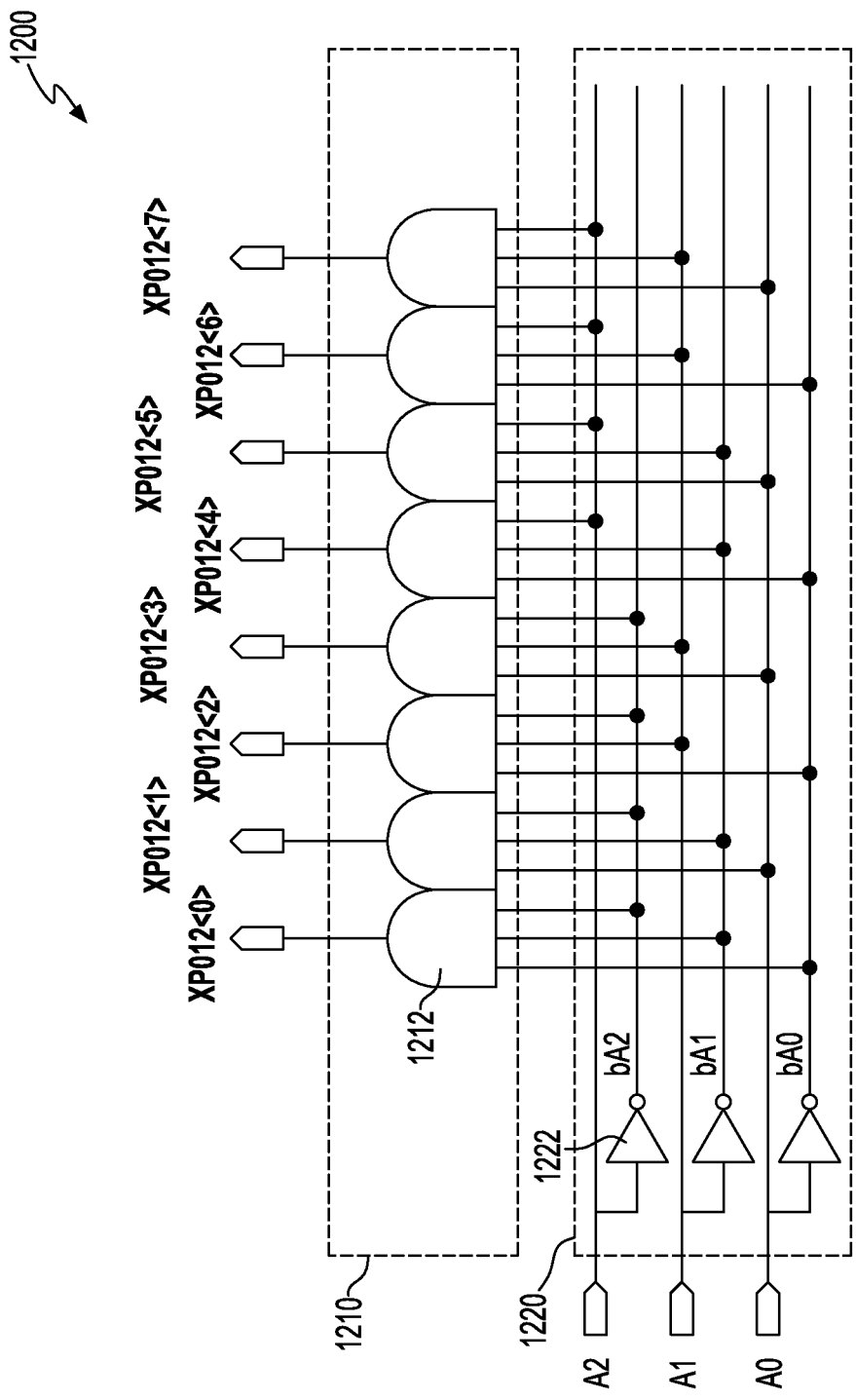
FIG. 12 shows an XP012 generator for generating predecoded signals coupling the NAND (926) of FIG. 9.

Referring to FIG. 12, XP012 generator generates pre-decoded signals (i.e. XP012<0:7>) coupling to NAND 926 shown in FIG. 9, consisting of the pre-decoder (1210) having a plurality of a 3-way AND logic (1212). Each of the 3-way AND logic is coupled to the corresponding address bus (1220). The address bus (1220) includes an inverted signal for each corresponding address using an inventor (1222). Pre-decoders XP345, and XP67 are similar structure to XP012.

Figure 13:
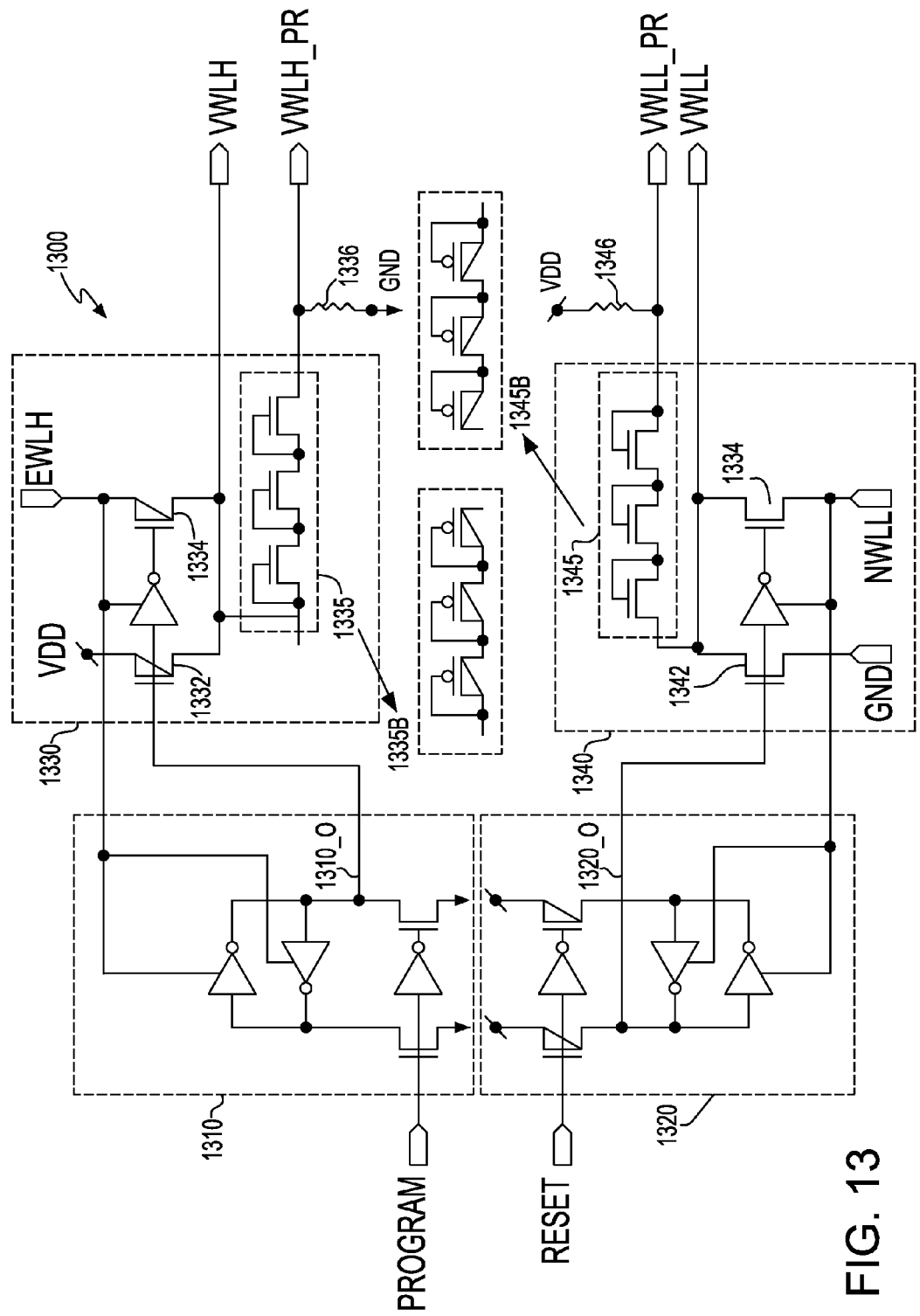
FIG. 13 shows an embodiment for controlling VWLH; VWLH_PR; VWLL; and VWL.

FIG. 13 shows an embodiment set to control VWLH, VWLH_PR, VWLL, and VWLL_PR that are controlled by the mode selection signal program for enabling the program mode, and further reset for enabling the reset mode. When the PROGRAM mode is low, the level shifter 1310 forces the node 1310_O at low, making PMOS (1332) turn on, and PMOS (1334) turn off, This results in coupling VDD to VWLH. VWLH is coupled to a plurality of NMOS gated diodes (1335), generating the VWLH_PR at VWLH—predetermined voltage (i.e.), where the predetermined voltage is determined by the NMOS threshold and the number of NMOS gated diodes. Alternatively, instead of using NMOS gated diode (1335), PMOS gated diode structure (1335B) can be used where the predetermined voltage is determined by the PMOS threshold and the number of PMOS gated diodes. When the program is high, the node 1310_O goes high, which turns PMOS (1334) on while disabling PMOS (1322). This results in coupling an elevated wordline high voltage (EWLH) to VWLH. The VWLH_PR tracks the VWLH voltage, which is lower than EWLH by a predetermined voltage (i.e. 1V) because of the gated diode connection (1335 or 1335B). The VWLH_PR can contains a resistor (1336) discharging the node very weakly to GND such that VWLH_PR is protected to not go higher because of another leakage path.

When the reset mode is low, the level shifter 1320 turns node 1320_0 at high turning NMOS (1342) on and NMOS (1344) off. This results in coupling the GND to VWLL. VWLL is coupled to a plurality of PMOS gated diodes (1345), generating VWLL_PR. VWLL_PR is higher than VWLL by a predetermined voltage (1V), where the predetermined voltage is determined by the NMOS threshold and the number of NMOS gated diodes (1345). Alternatively, instead of using the NMOS gated diode (1345), the PMOS gated diode structure (1345B) can be used where the predetermined voltage is determined by the PMOS threshold and the number of PMOS gated diodes. When the reset mode goes high, the node 1310_O goes low which turns NMOS (1344) on, while disabling NMOS (1342). This results in coupling the negative wordline voltage (NWLL) to VWLL. VWLL_PR therefore follows NWLH, which is higher than NWLH by a predetermined voltage (i.e. 1V). Optionally, VWLL_PR can contain a resistor (1346) precharging the node very weakly to VDD such that VWLH_PR is protected not to go lower because of other leakage paths.

Figure 14:
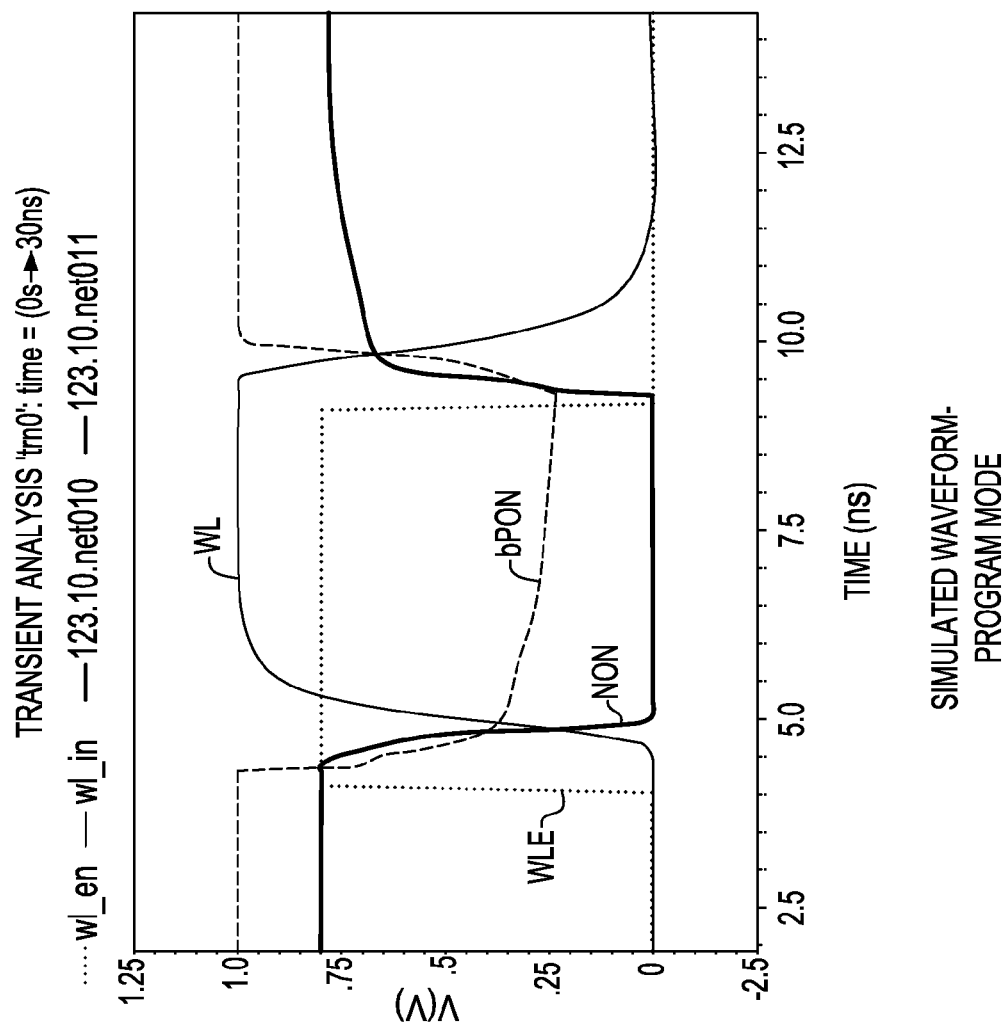
FIG. 14 illustrates simulated waveforms in Program Mode.
Figure 16:
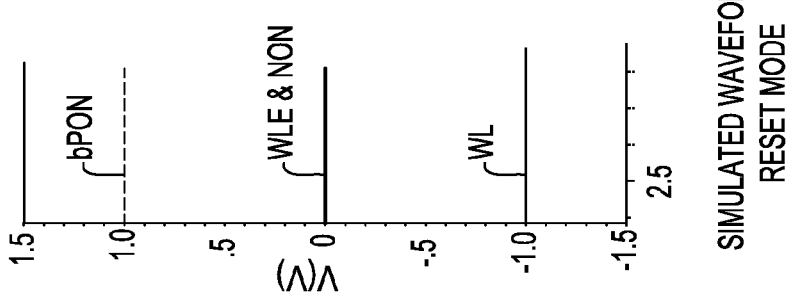
FIG. 16 illustrates simulated waveforms in Reset Mode.
Figure 15:
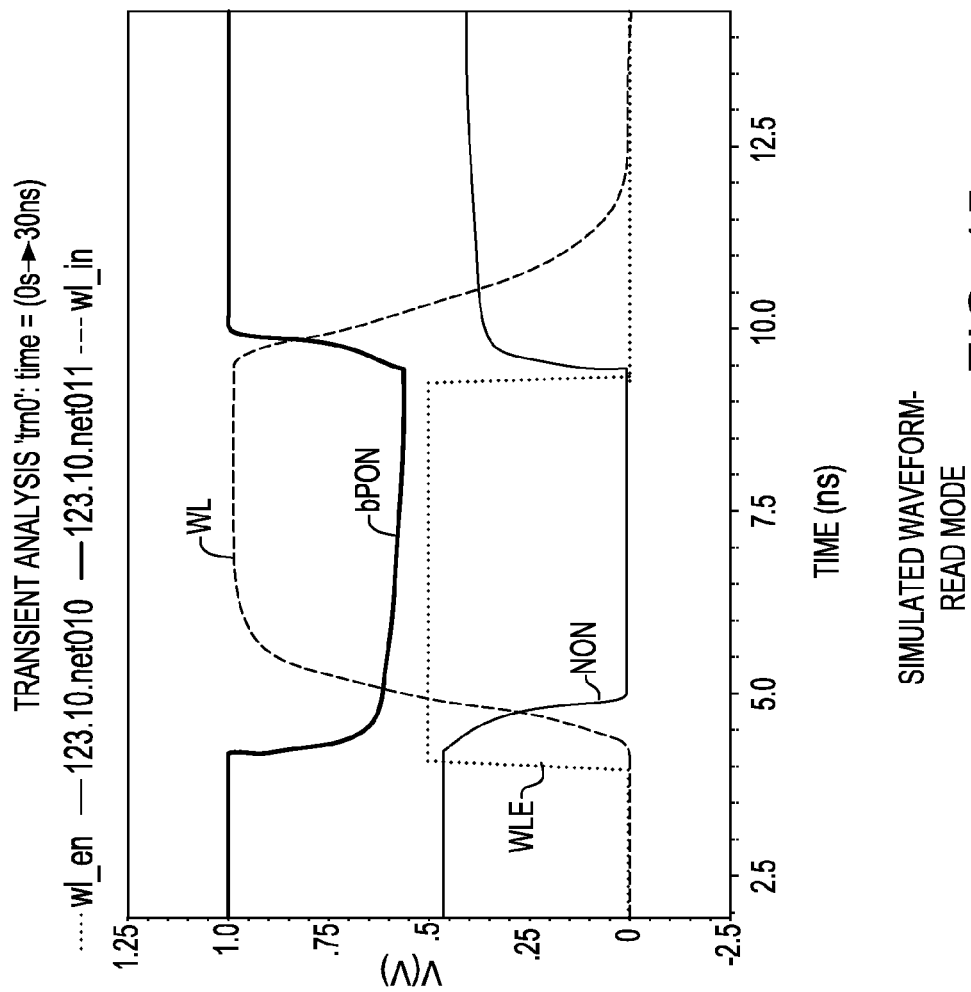
FIG. 15 illustrates simulated waveforms in Read Mode.

FIGS. 14-16 are the simulated waveforms showing up a CMOS level wordline enable signal (WLE), a up level shifted voltage signal (bPON), a down level shifter voltage signal (NON) and the wordline (WL).

While the present disclosure has been particularly shown and described with respect to preferred embodiments thereof, it will be understood by those skilled in the art that the foregoing and other changes in forms and details may be made without departing from the spirit and scope of the present disclosure. It is intended that the present disclosure not be limited to the exact forms and details described and illustrated, but fall within the scope of the appended claims

The invention claimed is:

1. A wordline decoder circuits controlling a charge trap behavior of an N-type MOSFET (NMOS) memory array having a plurality of rows and columns, comprising:
   a driver for a wordline, wherein said driver comprises a first P-type MOSFET (PMOS) device, a second PMOS device, a first NMOS device, and a second NMOS device, a source and drain coupled serially in a predetermined order from a wordline high voltage (VWLH) to a wordline low voltage (VWLL),
   a decoder coupled to a gate of said first PMOS and the gate of said second NMOS to select one out of said plurality of rows in said memory array, wherein said first PMOS activates one out of said plurality of wordlines selected by said decoder to said VWLH, while keeping remaining wordlines deactivated with VWLL, and
   said decoder having a level shifter comprising a third PMOS device, a fourth PMOS, a third NMOS device, and a fourth NMOS device, source and drain of which are coupled serially in this order from a wordline high voltage (VWLH) to ground (GND), a fifth PMOS device, a sixth PMOS device, a fifth NMOS device, and a sixth NMOS device, source and drain of which are coupled serially in this order from a wordline high voltage (VWLH) to GND, wherein said gate of the third PMOS device and the fifth PMOS device are cross-coupled to the drain of the fifth PMOS device and third PMOS device, respectively, the gate of the fourth PMOS device and the sixth PMOS device are coupled to the VWLH_PR, the gate of the third NMOS device and the fifth NMOS device are coupled to a power-supply (VDD), the gate of the fourth NMOS device is coupled to a select signal bSEL, and the sixth NMOS device is coupled to the inverted signal of bSEL, thereby enabling a voltage level conversion while protecting the third PMOS device, the fifth PMOS device, the fourth NMOS device and the sixth NMOS device from high voltage gate and source condition for programming and reset modes, and
   said decoder providing an output level shifted voltage signal converted from the bSEL signal at the drain of the fifth PMOS device for coupling to said first PMOS of said driver,
   wherein said output level shifted voltage signal swings from between a VWLH voltage to a VWLH_PR voltage and an added PMOS device threshold voltage for protecting said first PMOS device of said driver.

2. The wordline decoder circuits of claim 1, wherein said the gate of the second PMOS and the gate of first NMOS are coupled to a wordline high protection voltage (VWLH_PR), and a wordline low protection voltage (VWLL_PR), wherein the VWLH_PR is lower than the VWLH by the first predetermined voltage, and the VWLL_PR is higher than the VWLL by the second predetermined amount, such that the first PMOS and second NMOS are protected from high voltage source and drain condition used for programming and reset modes.

3. The wordline decoder circuits of claim 2, wherein said first and second NMOS and first and second NMOS are thin-oxide logic transistors.

4. The wordline decoder circuits of claim 3, wherein said decoder is a NAND logic coupling to at least one pre-decoded address, generating the selection signal (bSEL).

5. The wordline decoder circuits of claim 4, wherein said NAND logic further comprising coupling to a wordline enable signal (WLE), thereby enabling the one only when the WLE is enabled.

6. The wordline decoder circuits of claim 5 wherein the level shifter is a first level shifter to convert the NAND logic output voltage swing to VWLH and VWLH_PR swing wherein the first PMOS is protected from high voltage gate and source condition for programming and reset modes.

7. The wordline decoder circuits of claim 6, further comprising a second level shifter to convert the NAND logic output voltage swing to VWLL and VWLL_PR swing such that the second NMOS is protected from high voltage gate and source condition for programming and reset modes.

8. The wordline decoder circuits of claim 7, wherein said second level shifter comprises a seventh PMOS device, an eighth PMOS device, a seventh NMOS device, and an eighth NMOS device, a source and a drain terminal of which are coupled serially in this order from VDD to ground a wordline low voltage (VWLL), and a $9^{th}$ PMOS device, a tenth PMOS device, a $9^{th}$ NMOS device, and a tenth NMOS device, source and drain of which are coupled serially in this order from VDD to VWLL, wherein said gate of the eighth NMOS device and the tenth NMOS device are cross-coupled to the source of the tenth NMOS device and the eighth NMOS device, respectively, the gate of the eighth PMOS device and the tenth PMOS device are coupled to GND, the gate of the seventh NMOS device and the $9^{th}$ NMOS device are coupled to the VWLL_PR, the gate of the seventh PMOS device is coupled to the signal bSEL, and the $9^{th}$ PMOS device is coupled to the inverted signal of bSEL, thereby enabling a voltage level conversion while protecting the seventh PMOS device, the $9^{th}$ PMOS device, the eighth NMOS device and the tenth NMOS device from high voltage gate and source condition for programming and reset modes, said decoder providing an output level shifted voltage signal converted from the bSEL signal at the source of the tenth NMOS device.

9. The wordline decoder circuits of claim 1, further comprising:
   a first mode dependent voltage switch for receiving a program mode selection signal, said first mode dependent voltage switch for controlling an output level of the wordline driver by coupling an elevated wordline high voltage (EWLH) to the VWLH voltage responsive to receipt of a program mode signal, or otherwise coupling a lower VDD voltage to the VWLH voltage; and a second mode dependent voltage switch for receiving a reset mode selection signal, said second mode dependent voltage switch for controlling an output level of the wordline driver by coupling a negative wordline voltage (NWLL) to the VWLL voltage responsive to receipt of a reset mode signal, or otherwise coupling a ground voltage to the VWLL voltage.

10. The wordline decoder circuits of claim 2, wherein said VWLH_PR are coupled to a predetermined number "I" of diodes coupling to VWLH, such that VWLH_PR is lower than the VWLH by i×a threshold voltage of said gated diode.

11. The wordline decoder circuits of claim 10, wherein said VWLL_PR are coupled to a predetermined number "j" of diodes coupling to VWLL, such that VWLL_PR is higher than VWLL by j times a threshold voltage of said gated diode.

12. The wordline decoder circuits of claim 10, wherein said diode is a gated diodes using either an NMOS or PMOS transistor.

13. A level shifter comprising: a first set and second set of series connected devices, each first and second set comprising: a first PMOS device, a second PMOS device, a first NMOS device, and a second NMOS device, wherein a source terminal of a device in a set and drain terminal of the device in the set are coupled serially in a predetermined order from a first high voltage to a second low voltage, wherein the gate terminal of the first PMOS device in first set and the gate terminal of the first PMOS device in the second set are cross-coupled to the drain of the first PMOS device of said second set and the drain of said first PMOS device of the first set, respectively, the gate of the second PMOS device in both sets are coupled to a second high voltage lower than the first high voltage, and the gate of the first NMOS device in both sets are coupled to a first low voltage higher than the second low voltage, thereby turning first NMOS device in either first or second set to pull down the drain of first PMOS device in the corresponding set while protecting the first PMOS device and second NMOS device in both sets, from high voltages, and generating a voltage level conversion output coupling to said drain of first PMOS device in either first set or second set wherein said drain of said first PMOS device is an output coupling an output level shifted voltage signal converted from an input WL select signal received at a gate of said first NMOS device in a set for coupling to a gate of a wordline driver element, wherein said output level shifted voltage signal swings from between the first low voltage to said second high voltage value and an added PMOS device threshold voltage for protecting said gate of a wordline driver element.

14. A level shifter comprising:

a first set and second set of series connected devices, each first and second set comprising: a first NMOS device, a second NMOS device, a first PMOS device, and a second PMOS device, wherein a drain terminal of a device in a set and source terminal of the device in the set are coupled serially in a predetermined order from a first low voltage to a second high voltage, wherein the gate terminal of the first NMOS device in first set and the gate terminal of the first NMOS device in the second set are cross-coupled to the drain of the first NMOS device of said second set and the drain of said first NMOS device of the first set, respectively, the gate of the second NMOS device in both first and second sets are coupled to a second low voltage higher than the first low voltage, and the gate of the first PMOS device in both sets are coupled to a ground potential thereby turning a PMOS device on in either first or second set to pull up the drain of first NMOS device in the corresponding set while protecting the first NMOS device and second PMOS device in both sets, from high voltages, and generating a voltage level conversion output coupled to said drain of first NMOS device in either first set or second set, wherein said drain of said first NMOS device is an output coupling an output level shifted voltage signal converted from an input WL select signal received at a gate of said second PMOS device in a set for coupling to a gate of a wordline driver element, wherein said output level shifted voltage signal swings from between the first low voltage to said second high voltage value and an added PMOS device threshold voltage for protecting said gate of a wordline driver element.

* * * * *